United States Patent
Rolland

(10) Patent No.: US 8,002,857 B2
(45) Date of Patent: Aug. 23, 2011

(54) PROCESS FOR PREPARATION OF A MIXED FEEDSTOCK THAT CONTAINS BIOMASS AND A HEAVY HYDROCARBON FRACTION FOR THE PURPOSE OF SUBSEQUENT GASIFICATION

(75) Inventor: Matthieu Rolland, Vernaison (FR)

(73) Assignee: IEP Energies Nouvelles, Rüeil Malmaison Cedex (FR)

( * ) Notice: Subject to any disclaimer, the term of this patent is extended or adjusted under 35 U.S.C. 154(b) by 392 days.

(21) Appl. No.: 12/147,883

(22) Filed: Jun. 27, 2008

(65) Prior Publication Data

US 2009/0013603 A1    Jan. 15, 2009

(30) Foreign Application Priority Data

Jun. 28, 2007 (FR) ..................... 07 04738

(51) Int. Cl.
C10J 3/54 (2006.01)
C10L 5/00 (2006.01)

(52) U.S. Cl. ...... 48/197 R; 48/206; 48/209; 48/197 FM; 44/502; 44/504; 44/589; 44/605

(58) Field of Classification Search ............. 48/197 R, 48/206, 209; 110/341, 346; 44/502, 504, 44/589, 590, 605; 423/650
See application file for complete search history.

(56) References Cited

U.S. PATENT DOCUMENTS

| | | | |
|---|---|---|---|
| 4,959,154 A * | 9/1990 | Simmons | 210/680 |
| 5,211,723 A * | 5/1993 | Khan | 48/197 R |
| 5,244,472 A * | 9/1993 | Simmons | 44/505 |
| 5,685,153 A * | 11/1997 | Dickinson et al. | 60/648 |
| 5,954,001 A | 9/1999 | Morin | |
| 6,217,939 B1* | 4/2001 | Sailer et al. | 427/325 |
| 6,818,027 B2* | 11/2004 | Murcia | 44/550 |
| 6,883,444 B2* | 4/2005 | Logan et al. | 110/345 |
| 7,320,715 B2* | 1/2008 | Shigehisa et al. | 44/605 |
| 2004/0123519 A1* | 7/2004 | Shigehisa et al. | 44/605 |
| 2007/0062117 A1* | 3/2007 | Schingnitz et al. | 48/210 |
| 2008/0022595 A1* | 1/2008 | Lemaire et al. | 48/209 |
| 2008/0149896 A1* | 6/2008 | Lenglet | 252/373 |
| 2008/0236043 A1* | 10/2008 | Dinjus et al. | 48/197 R |

FOREIGN PATENT DOCUMENTS

| | | |
|---|---|---|
| DE | 196 43 572 C1 | 4/1998 |
| DE | 101 53 975 A1 | 5/2003 |
| DE | 102005006305 * | 2/2005 |
| EP | 0 747 462 A1 | 12/1996 |
| GB | 944 282 A | 12/1963 |
| WO | WO 01/25689 A1 | 4/2001 |

* cited by examiner

Primary Examiner — N. Bhat
(74) Attorney, Agent, or Firm — Millen, White, Zelano & Branigan, P.C.

(57) ABSTRACT

A process for preparation of biomass mixed with a heavy hydrocarbon fraction yields a feedstock for the purpose of supplying a gasification unit. The process comprises a first mixing stage followed by a grinding stage and makes it possible to deliver a suspension of biomass particles less than 500 microns in size that are dispersed in the heavy hydrocarbon fraction.

18 Claims, 3 Drawing Sheets

PROCESS FOR PREPARATION OF A MIXED FEEDSTOCK THAT CONTAINS BIOMASS AND A HEAVY HYDROCARBON FRACTION FOR THE PURPOSE OF SUBSEQUENT GASIFICATION

FIELD OF THE INVENTION

This invention relates to a process for preparation of a biomass-type feedstock that contains lignocellulosic fibrous material, mixed with a heavy hydrocarbon fraction for the purpose of supplying a gasification unit that is designed in particular for the production of a synthesis gas.

A heavy hydrocarbon fraction is defined as a fraction with a boiling point of more than 350° C., for example, a vacuum residue or a so-called HCO fraction that is obtained from a catalytic cracking unit, or any mixture of these various fractions.

The gasification unit produces a gas that contains essentially carbon monoxide and hydrogen, known to one skilled in the art under the name of synthesis gas, also sometimes called "syngas" or "synthesis gas" according to English terminology.

In the text below, we will maintain the conventional name of synthesis gas.

The synthesis gas then makes it possible to reconstruct a set of hydrocarbon fractions, in particular a gasoline fraction and a gas oil fraction, by means of the Fischer Tropsch synthesis. The synthesis gas can also be used as a vector for the purpose of the production of energy, or as a raw material for the production of bases for chemistry and petrochemistry.

This invention is not linked to a particular use of the synthesis gas, but an important application of this invention lies in the production line of synthesis hydrocarbons, in particular of gasolines and gas oil, starting from a raw material that consists at least partly of biomass, a line that is known under the name BTL. More specifically, the biomass that is used as a feedstock within the scope of this invention is of the lignocellulosic type, for example wood chips of any type, scrap straw or sugar cane debris, or any other type of ligneous waste.

In the text below, as a typical example of lignocellulosic feedstock, we will use the wood chips that result from a preliminary shredding. The shredding stage is not part of this invention, but can be added to it upstream if necessary.

These wood chips are generally delivered in the form of particles of several centimeters and can contain up to 40% water. They constitute the biomass feedstock in question in the text below. More particular mention will be made of wood pellets when the wood particles will have essentially the parallelepiped shape with typical length/width/height dimensions of 5 cm/2 cm/2 cm.

This invention makes possible the conditioning of the biomass feedstock for the purpose of its subsequent treatment in a gasification unit, more particularly a gasification unit in an entrained bed that requires a particle size as input on the order of one hundred microns. Conditioning of the feedstock, in terms of this invention, is defined as the constitution of a suspension of fine particles of biomass dispersed within a heavy hydrocarbon fraction, sometimes called "slurry" in English terminology.

The thus formed suspension can also comprise in addition solid biomass particles, other solid particles with a suitable granulometry, such as petroleum coke particles or carbon particles.

EXAMINATION OF THE PRIOR ART

One skilled in the art knows the process of thermolysis at temperatures of between 200° C. and 250° C. and dwell times on the order of several minutes, for the purpose of preparing a lignocellulosic biomass-type feedstock for then being treated in fluidized-bed or entrained-bed processes, and in particular in a gasification unit with an entrained bed. It is known in particular that the mild thermolysis, or roasting, modifies the structure of the biomass in such a way that the subsequent grinding operations are thereby facilitated.

Patent application FR 06/07,049 of the applicant describes a process for preparation of biomass for the purpose of supplying a gasification unit that uses a mild pyrolysis or roasting at a temperature of between 250° C. and 350° C.

This roasting stage requires an input of calories and should be preceded by a drying stage that is carried out at a temperature that is lower than 150° C., preferably less than 120° C., that makes it possible to reach a water content of the biomass to be treated of about 10% by weight.

In this invention, the drying is carried out during the mixing stage between the biomass and the heavy hydrocarbon fraction. The result is a substantial economic gain.

In addition, the grinding stage of the biomass in the process according to the above-mentioned application requires a cooling of the solid so as to avoid any risk of combustion of said solid in the ambient air. The fact that, in this invention, the grinding stage does not take place solely on the biomass, but on a mixture of biomass and hydrocarbon fraction that surrounds the particles of biomass, eliminates this cooling constraint.

This point has a very important impact on the economy of this process that is clearly more favorable than that of the prior art that is based on a roasting of the biomass particles. The process according to this invention delivers biomass particles that are less than 500 microns in size in the form of a suspension of said particles that are dispersed in a heavy hydrocarbon fraction, such as a vacuum residue or an HCO-type fraction.

SUMMARY DESCRIPTION OF THE INVENTION

Figure 1:
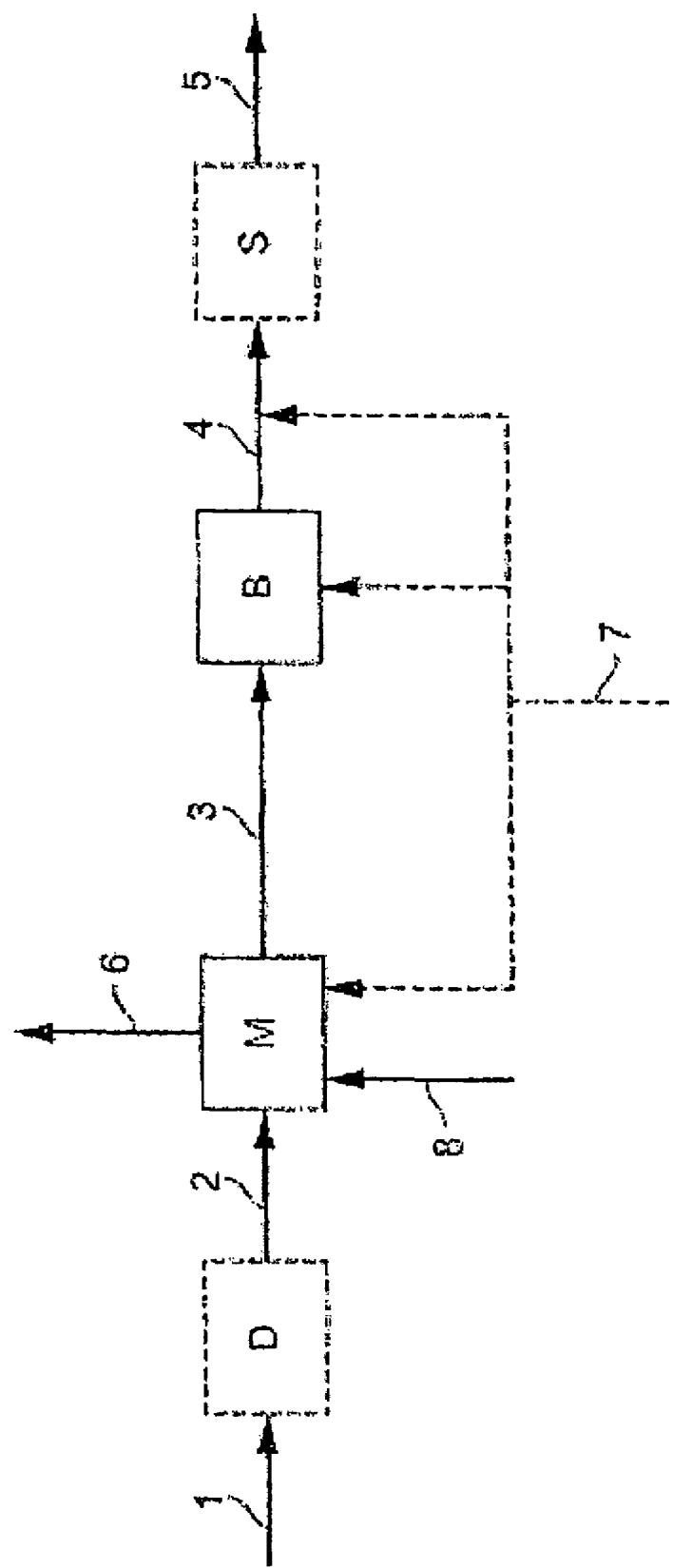
FIG. 1 is a diagram of the process for pretreatment according to the invention that is used as a support to the detailed description below. The lines that are marked in dotted form correspond to optional elements.

This invention relates to a process for pretreating a feedstock that comprises a mixture of lignocellulosic material and a heavy hydrocarbon fraction for the purpose of its subsequent treatment in a gasification unit, more particularly in an entrained bed.

The lignocellulosic raw material comprising, for example, wood and vegetable wastes such as processing waste from beets, sugar cane, or other vegetables that are used for the production of sugar or ethanol. This raw material is generally available in the form of pellets or chips of a typical maximum size of between 0.5 cm and 5 cm, and with a water content of between 10% and 40% by weight.

Several nonlimiting examples of lignocellulosic biomass material are provided below:
  Waste from agricultural operations (straw . . . )
  Waste from forestry operations (initial cutting products)
  Products from forestry operations
  Dedicated cultivation (short rotation shrubbery)
  Processing wastes from beets, sugar cane, . . . .

The process for pretreating the lignocellulosic biomass type material according to this invention assumes that the biomass is available in the form of chips of between 0.5 and 5 cm in size. Optionally, a primary grinding stage or shredding stage will be necessary to reach said chip size, but it is not an integral part of this invention.

The hydrocarbon fraction that is used can be a so-called vacuum residue fraction or an HCO fraction that is obtained from a catalytic cracking unit, or even more generally, a hydrocarbon fraction that is easily pumped under storage conditions in refineries.

The hydrocarbon fraction that makes it possible to constitute the suspension can also be a mixture in any proportion of the various fractions cited.

It is preferably a heavy fraction in the sense that its initial boiling point is higher than 350° C. In general, such a fraction has a viscosity that is less than 300 cSt at a temperature of 150° C.

The thus constituted suspension can be used as a supply feedstock for a gasification unit in an entrained bed for the purpose of producing a synthesis gas.

The process for pretreating the lignocellulosic biomass-type material according to the invention makes it possible to deliver a suspension with particles of said biomass that have a maximum size of less than 500 microns, dispersed in a heavy hydrocarbon fraction with an initial boiling point that is higher than 350° C., consisting hereinafter of the following stages:

One stage (1) for mixing the biomass with the heavy hydrocarbon fraction so as to reach a moisture level of the biomass particles that is less than 10% by weight, preferably less than 5% by weight, and a temperature of the mixture of between 200° C. and 300° C.

One stage (2) for grinding the mixture of biomass and the heavy hydrocarbon fraction making it possible to reduce the biomass particles to a size that is less than 500 microns, whereby the suspension that is formed has a biomass content that is less than 30% by weight, One stage (3) for supplying the gasification unit by the suspension that is formed in stage (2) at a temperature of between 200° C. and 300° C.

Preferably, the mixing stage is carried out at a temperature of between 250° C. and 280° C. with a dwell time of between 1 and 20 minutes, and more preferably between 5 and 15 minutes.

The process according to the invention therefore makes it possible to produce a suspension of lignocelullosic biomass-type particles that are dispersed in a heavy hydrocarbon fraction, whereby the size of the particles in the suspension is preferably between 200 and 500 microns.

It is possible, while remaining within the framework of this invention, to introduce particles of coke, petroleum or carbon in any proportions into a mixture with the biomass particles, with, however, a minimum number of biomass particles that is more than 5% by weight in the mixture. These particles, other than the biomass particles, can be introduced either at the mixing stage or at the grinding stage, or, finally, downstream from said grinding stage.

DETAILED DESCRIPTION OF THE INVENTION

In this portion of the text, we are providing a description of the process according to the invention by means of FIG. 1, in which the optional elements appear in dotted form.

If necessary, the lignocellulosic feedstock (flow 1) undergoes a coarse grinding or shredding stage in the primary mill (D) that brings the size of the biomass particles to values that are less than 5 cm. The typical form of the biomass particles is that of a pellet of about 5 cm in length, 2 cm in width, and 2 cm in thickness.

Mixing Stage (1)

At the output of the optional shredding stage, the feedstock that is represented by the flow (2) supplies the mixing unit (M). The heavy hydrocarbon fraction is introduced into the mixing unit by the flow (8).

Figure 2:
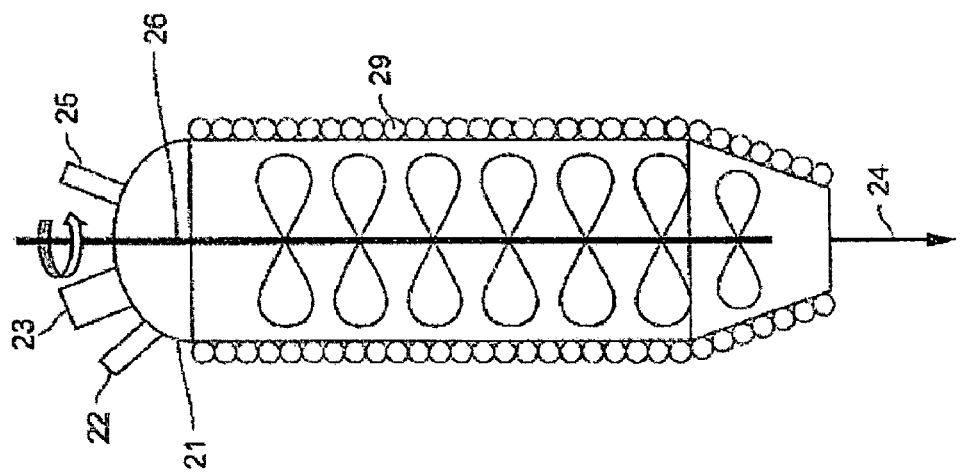
FIG. 2 is a diagrammatic representation of the unit that is used to carry out the mixing stage.

The mixing unit is a closed chamber, stirred and working at atmospheric pressure of which a diagrammatic depiction is given in FIG. 2.

The object of the mixing unit (M) is, on the one hand, to produce as thorough a mixing as possible of the biomass particles (2) with the heavy hydrocarbon fraction (8) and to reduce the water content of said feedstock to a value that is less than 10% by weight, and preferably less than 5% by weight.

A certain amount of water is released during the mixing by the flow (6).

The preferred operating conditions for the production of the mixing stage are a temperature of between 200° C. and 300° C., and preferably between 250° C. and 280° C., and a dwell time of the biomass particles of between 1 and 20 minutes, and preferably between 5 and 15 minutes.

The value of the dwell time depends primarily on the size of the biomass particles.

By way of indication, for the pellets of length/width/height dimensions of respectively 5 cm/2 cm/2 cm, the dwell time of the mixing stage is between 5 and 15 minutes.

The heavy hydrocarbon fraction (8) is reheated in general by tracing with vapor before being injected into the mixing unit (M) by means of the pipe (22) at a temperature of between 250° C. and 350° C.

The initial temperature of the heavy hydrocarbon fraction is calculated such that the mixing temperature after evacuation of the water vapor is between 200° C. and 300° C., and preferably between 250° C. and 280° C.

The thermal shock that results from the contact between the biomass particles (2) at ambient temperature and the hydrocarbon fraction (8) at a temperature of between 250° C. and 350° C. leads to a first mechanical embrittlement of the biomass.

In contrast, the release of the water contained in the pores of the biomass particles is accompanied by an increase in the internal pressure within the pores. This increase in internal pressure has the result of promoting the diffusion of water from the core of the biomass particles toward the outside and also contributing to embrittling the biomass.

The mixing unit (M) consists of a chamber (21) that is held at the desired temperature by a so-called double-envelope system, as shown in FIG. 2. The heating fluid that circulates in the tubes (29) is generally vapor at a temperature that is higher than the mixing temperature.

The chamber (21) generally has a narrow shape with a height to diameter ratio of between 10 and 2, and preferably between 5 and 2.5. The narrow shape allows a heat transfer that is adequate for maintaining the temperature despite the endothermic reactions that may occur during mixing between the biomass particles and the heavy hydrocarbon fraction.

The solid biomass particles are introduced into the chamber (21) by gravity by means of the input tube (23) and brought into close contact with the heavy hydrocarbon fraction by means of a mechanical stirring mechanism with multiple blades (26), such as, for example, the one that is shown diagrammatically in FIG. 2. The speed of rotation of the stirring mechanism (26) is in general between 1 and 20 rpm.

The feed rate of the biomass particles is regulated by weighting by means of a storage tank that is mounted on spring balances located above the mixer (M) (not shown in FIG. 2). The hydrocarbon fraction is introduced into the unit via the pipe (22), and the water is evacuated via the pipe (25).

The biomass particles, mixed with the heavy hydrocarbon fraction, are evacuated from the mixing unit via the pipe (24).

It should be noted that the mixing stage leads to a coating of the biomass particles by the liquid hydrocarbon fraction that has two positive effects:

1) The biomass particles are thus protected from the oxygen of the air, in particular during their transfer toward the following grinding stage. It is therefore not necessary to use an inert gas to carry out this transfer.
2) The liquid hydrocarbon that surrounds the biomass particle makes possible an excellent heat transfer and therefore the production of a sudden thermal shock and the consecutive evaporation of the water that is contained in the biomass particles.

The water that leaves the biomass particles passes through the hydrocarbon layer that surrounds said particles because of the internal pressure. The formation of a foam results from this process. It was observed by experimentation that the mechanical stirring by the blades makes it possible to break said foam and thus to improve the rate of transfer of the water vapor from the particles to the output of the mixing unit. The gas that is evacuated via the pipe (25) contains, for the most part, water (>60% by volume) and also several light organic products (methanol, furfural, acetic acid, . . . ).

The flow (3) that leaves the mixing unit (M) consists of a continuous phase of hydrocarbons that contain biomass particles at a temperature of between 200° C. and 300° C., preferably between 25° C. and 280° C. This flow (3) is sent without cooling into the grinding unit (B), either By means of a liquid/solid pump without cooling when the biomass particles have a size that is compatible with a pumping, i.e., typically on the order of one cm for a heavy hydrocarbon fraction of the vacuum residue type, By gravity when the size of the biomass particles is greater, in particular when it is a matter of wood pellets with length/width/height respectively 5 cm/2 cm/2 cm.

Grinding Stage (2)

The biomass that is thus treated at the output of the mixing stage is, remarkably, much easier to grind than the biomass that is simply dried by contact with a hot gas.

This comes in part from the fact that the biomass is embrittled by the thermal shock that is produced during the mixing stage.

Actually, the heating speed of the biomass particles upon contact with the heavy hydrocarbon fraction is on the order of 10 to 100× higher then upon contact with a gas.

Instead of heating within 2-5 minutes, which would be the case with heating according to the prior art by contact with a hot gas, the temperature elevation takes place within several seconds. This rapid rise in temperature leads to the biomass particles being embrittled and to an evaporation of the moisture in the form of "pressurized" vapor. The more or less abrupt ejection of this pressurized vapor outside of the pores of the biomass particles also contributes to the mechanical embrittlement.

Regardless of the exact mechanism of the embrittlement of the biomass particles, the energy that is required by the grinding stage is clearly reduced relative to what it would be following drying according to the prior art.

By way of illustration, it is possible to cite the following energy consumption values typically to reduce the size of biomass particles on average from 20 mm to 1 mm for different levels of moisture of the biomass particles:

Biomass with 30% moisture: 90 KWh/ton
Biomass with 10% moisture: 50 KWh/ton
Biomass with 5%-10% moisture: 30 KWh/ton.

Figure 3:
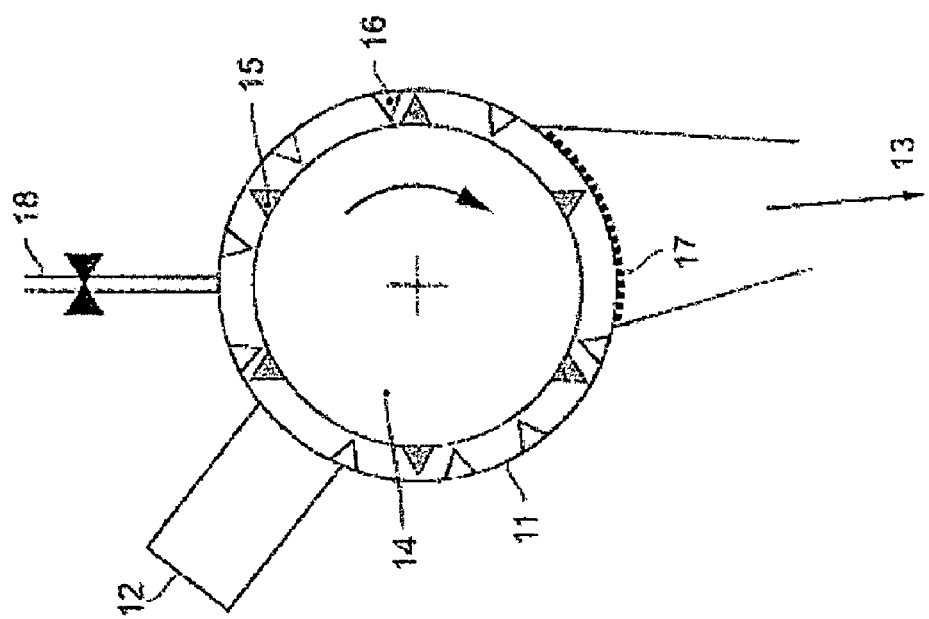
FIG. 3 is a diagrammatic representation of the unit that is used to carry out the grinding stage.

The grinding unit can be described in the following manner by means of FIG. 3:

The feedstock is injected via the pipe (12) that is located on the periphery of a static envelope that is called a stator (11). A rotary roller called a rotor (14), equipped with blunt protrusions (15), is located inside and essentially concentrically to the stator (11). The stator (11) is equipped with blunt protrusions (16). Over a portion of its inside surface, the rotor (14) comprises blunt protrusions (15) of a shape that is complementary to those of the stator (11) and on another portion of its surface, a perforated grid (or a mesh) (17) whose holes have a single dimension.

By a complementary shape of blunt protrusions (15) and (16), it is necessary to understand that it is impossible for a particle to not be sheared between protrusions (15) and (16) of the rotor (14) and the stator (11).

The feedstock to be ground is sheared between the protrusions of the rotor and the stator and broken into at least two particles of smaller size.

When the particles have a small enough size, they pass through the perforated grid (17) that acts as a sieve.

The maximum dimension of ground particles can be larger, at least in a certain direction, than the passage of the grid (17). This is the case in particular of particles in the shape of a match. The size of the orifices of the grid (17) is therefore to be less than the maximum size allowed for the particles after grinding. This size deviation depends primarily on the type of biomass being treated.

The space encompassed between the rotor (14) and the stator (11) is occupied by the liquid mixture/biomass particle. An air vent (18) that is located at the highest point of the stator makes it possible to evacuate any gas that is optionally contained in the mill upon the start-up of said mill.

After grinding, the mixture is evacuated via the pipe (13).

To keep the temperature at the required level, the rotor (14) and the stator (11) are reheated by a double-wall or coil-type system in which a hot fluid, generally vapor, circulates. The heating system is not shown in FIG. 3. The blunt protrusions (15) and (16) of the rotor (14) and the stator (11) may be shaped like blades (they are also knives) or paving stones (they are then hammers), whose edges are sharpened and optionally inclined or curved to accentuate the shearing effect. The tapered knife-type shapes with the straight or curved edges are preferred because they make it possible to break the vegetable fibers by more powerful shearing. The presence of liquid hydrocarbons within the mixture to be ground, because of its high heat conductivity, prevents the formation of hot points during the grinding, such that the temperature of the biomass does not exceed a maximum temperature of 300° C. and preferably 280° C. at any point inside the mill.

The working torque of the grinding unit can be evaluated by an increase of 50% relative to the same piece of equipment that works on biomass particles by themselves.

Upon the start-up of the mill, the liquid hydrocarbon fraction is sent in a first step by itself through the pipe (12) so as to purge the device of any trace of gas by opening the valve on the air vent (18). When the mill is entirely filled with liquid, it is then possible to introduce the mixture of hydrocarbon fraction and biomass particles by means of the pipe (12).

When the desired grain size for the biomass particles is fine, it is preferable to use a series of two or three mills that are adjusted to increasingly fine grain sizes. The initial diameter/final diameter ratio is generally between 50 and 10 per grinding unit, whereby this ratio decreases when the grain sizes become finer.

In other words, the various mills that are used will have initial diameter to final diameter ratios that are increasingly smaller in terms of the process.

Thus, to pass from a pellet of length/width/height respectively 5 cm/2 cm/2 cm to a powder with a maximum grain size of 200 microns, it is preferable to use 2 mills, for example a first mill with a grid size of 2 mm (ratio of 25) and a second mill with a grid size of 180 microns (ratio of 11).

The concept of grain size of the powder is understood by reference to the mean diameter of the particles that constitute said powder. This mean diameter is defined conventionally as the diameter of a spherical particle that has the same surface to volume ratio as the particle that is being considered (which may have a non-spherical shape).

The suspension can also comprise in addition biomass particles or other types of particles such as, for example, particles of coke, petroleum, or particles of carbon.

These particles denoted (7) in FIG. 1 can be introduced either at the mixing stage (M) or at the grinding stage (B), or optionally downstream from the grinding stage (this then requires another mixer).

The suspension that is thus constituted, either only from biomass particles or mixed with other solid particles such as particles of coke or even carbon, has an overall content of solid particles that represents 5% to 30% by weight.

Transfer of the Ground Mixture to the Gasification Unit

The product that is obtained after the grinding stage (2) is a suspension of biomass particles dispersed in a heavy liquid hydrocarbon fraction (denoted flow (4) in FIG. 1).

An important characteristic of the suspension that is obtained is to be able to be pumped and injected into the pressurized gasifier (generally greater than 30 bar with 1 bar=105 Pascal), which requires a viscosity on the order of 100-300 cSt (abbreviation of centistokes, or $1/100^{th}$ of stokes) according to the pumps and the injector technologies.

The viscosity of the suspension can be adjusted with the temperature; however, the latter is to remain as much as possible less than about 300° C. to prevent any risk of cracking of the hydrocarbon fraction. This cracking would actually increase the risk of fouling the installations by a coke deposit.

The grain size of the biomass particles (and optional other solid particles) is first of all selected so as to be compatible with the pump and injection technology in the gasification unit.

Within the framework of the invention, a minimum mean size of 200 μm (microns) is preferred to limit the cost of grinding. Conversely, a maximum size of 500 μm is preferred for the homogeneity of the flows (absence of sedimentation, for example).

The reactivity constraints in the gasification unit are also to be taken into consideration, but are not in general the limiting factor for the pressurized gasification reactions. The biomass is a very reactive material, and particles of mean size of between 200 and 500 μm are perfectly well-suited to the subsequent gasification unit. This invention therefore makes it possible to obtain a suspension of biomass particles that are less than 500 microns in size, and preferably between 200 and 500 microns, dispersed in a heavy hydrocarbon fraction with an initial boiling point of more than 350° C.

The suspension is then injected continuously in the gasifier at the mixing temperature, or between 200 and 300° C.

The injection pressure is between 20 and 40 bar (1 bar=105 Pascal), which makes it possible to reduce the size of the equipment and to use a pressure that is higher than the required pressures downstream from the gasifier (synthesis unit FT or turbines for the production of electricity). The pressurization takes place after the grinding stage by means of a pump (S). This pressurization is very economical because it is produced with a single pump, contrary to the technologies of dry particles that require the alternating pressurization of airlocks, drums (lock-hoppers) by neutral gases. At the output of the pump (S), a flow (5) that is ready to be injected into the gasification unit downstream is recovered (not shown in FIG. 1).

EXAMPLES

Tests carried out on the laboratory scale have shown that it is possible to obtain a suspension of wood particles that are between 200 and 400 microns in size and are dispersed in the vacuum residue fraction (denoted RSV in the abstract) from wood chips whose largest dimension is less than 1 cm, and a vacuum residue with density 1.037 kg/m3 and with an initial boiling point that is more than 350° C.

The suspension that is obtained has a wood concentration of 10 wt % and a viscosity that is less than 300 cSt (obtained by a temperature of more than 175° C.).

A material balance sheet that is extrapolated on the industrial scale according to the diagram of the process of FIG. 1 is provided below:

| Flow No. | Description | Flow Rate (t/h) | Temperature (° C.) | Mean Diameter of the Particles |
|---|---|---|---|---|
| 1 | Raw biomass particles with 25% moisture | 100 | 25 | 2 cm |
| 7 | Flow of other solid particles | 20 | 25 | 500 μm |
| 8 | Heavy HC fraction flow entering the mixer | 400 | 300 | — |
| 3 | Biomass particles suspension in HC fraction after mixing | 480 | 250 | 2 cm |
| 6 | Water vapor exiting the mixture | 20 | 250 | — |
| 4 | Biomass particles suspension in the HC fraction after grinding | 480 | 250 | 180 μm |
| 5 | Suspension that is ready to be injected into the gasifier | 500 | 250 | 180 μm |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application Ser. No. 07/04.738, filed Jun. 28, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for pretreating lignocellulosic biomass material in the form of particles with a maximum size of between 0.5 cm and 5 cm for the purpose of supplying a gasification unit, comprising the following stages in the absence of a prior stage of heated drying of said biomass so as to decrease the water content of the biomass:
    One stage (1) for mixing the lignocellulosic biomass particles in a mixer M with a heavy hydrocarbon fraction having an initial boiling point higher than 350° C., heated to a temperature of between 250° C. and 350° C., so as to provide a moisture level of the biomass particles of less than 10% by weight, and a temperature of the mixture of between 200° C. and 300° C.,
    One stage (2) for grinding the mixture obtained at the end of stage (1) in a mill B, so as to reduce the biomass particles to a size less than 500 microns, and to form a suspension having a biomass content less than 30% by weight,
    One stage (3) for supplying the gasification unit with the suspension formed in stage (2) at a temperature of between 200° C. and 300° C.

2. A process for pretreating the lignocellulosic biomass-type material according to claim 1, in which the mixing stage (1) is carried out at a temperature of between 250-280° C. with a dwell time of between 1 and 20.

3. A process for pretreating the lignocellulosic biomass-type material according to claim 1, in which the size of the biomass particles in the suspension at the end of stage (2) is between 200 and 500 microns.

4. A process for pretreating the biomass-type material according to claim 1, in which the mixing stage (1) is carried out in a mixer (M) having a height to diameter ratio of between 10 and 2.

5. A process for pretreating the biomass-type material according to claim 1, in which the grinding stage (2) is carried out in a mill (B) that consists essentially of a rotor in rotation inside a stator, both equipped with additional blunt protrusions.

6. A process for pretreating the biomass-type material according to claim 5, wherein the blunt protrusions that equip the rotor and the stator of the piece of grinding equipment have the shape of tapered knifes, with straight or curved edges.

7. A process for pretreating the biomass-type material according to claim 1, wherein the heavy hydrocarbon fraction is a vacuum residue (RSV) or an HCO fraction that is obtained from a catalytic cracking unit, or any mixture of said fractions.

8. A process for pretreating the biomass-type material according to claim 1, in which the suspension comprises both biomass particles and petroleum coke, or carbon particles, in any proportions, whereby solid particles represent between 5% by weight and 30% by weight of the suspension.

9. A process for pretreating the biomass-type material according to claim 1, in which the suspension comprises both biomass particles and petroleum coke or carbon particles, and introducing coke or carbon particles in addition to the biomass particles into a mixer (M).

10. A process for pretreating the biomass-type material according to claim 1, wherein the suspension comprises both biomass particles and petroleum coke or carbon particles, wherein the coke or carbon particles in addition to the biomass particles into the mill.

11. A process for pretreating the biomass-type material according to claim 1, wherein size reduction of the biomass particles within the grinding stage (2) is conducted with means of two or three mills in series, wherein the mills operate with an initial diameter to final diameter ratio of between 10 and 50, and wherein said ratio decreases when the operation moves from one mill to the next in the direction of the process.

12. A process for gasification in an entrained bed that uses as a feedstock the suspension of biomass particles in a heavy hydrocarbon fraction, whereby the biomass particles are obtained from pretreatment according claim 1.

13. A process according to claim 1, wherein the moisture level of the biomass particles is less than 5% by weight.

14. A process according to claim 1, wherein the dwell time is between 5 and 15 minutes.

15. In a process for pretreating particulate lignocellulosic biomass material prior to subjecting said biomass to gasification, the improvement comprising mixing biomass particles with a heavy hydrocarbon fraction having an initial boiling point higher than 350° C., heated to a temperature of between 250° C. and 350° C., so as to provide a moisture level of the biomass particles of less than 10% by weight, and a temperature of the mixture of between 200° C. and 300° C.

16. In a process for pretreating particulate lignocellulosic biomass material prior to subjecting said biomass to gasification, the improvement comprising grinding a mixture of biomass particles and heavy hydrocarbon so as to reduce the biomass particles to a size less than 500 microns, and to form a suspension having a biomass content less than 30% by weight.

17. A process according to claim 1, wherein only lignocellulosic particles are mixed with a heavy hydrocarbon fraction in stage (1).

18. A process according to claim 1, wherein the suspension resulting from the mixing stage is sent without cooling into the grinding stage.

* * * * *